United States Patent [19]
Davidson

[11] Patent Number: 5,983,019
[45] Date of Patent: Nov. 9, 1999

[54] METHOD AND SYSTEM FOR PROVIDING INTERPRETIVE ACCESS TO AN OBJECT SYSTEM

[75] Inventor: Thomas J. Davidson, Austin, Tex.

[73] Assignee: Tandem Computers Incorporated, Cupertino, Calif.

[21] Appl. No.: 08/819,535

[22] Filed: Mar. 17, 1997

Related U.S. Application Data

[60] Provisional application No. 60/013,635, Mar. 18, 1996.

[51] Int. Cl.$^6$ ........................................... G06F 9/45
[52] U.S. Cl. ...................... 395/705; 395/704; 395/710
[58] Field of Search ..................... 395/683, 700, 395/702, 705, 200.38, 704, 710; 345/352, 326; 707/2, 100

[56] References Cited

U.S. PATENT DOCUMENTS

| | | | |
|---|---|---|---|
| 5,307,499 | 4/1994 | Fong | 395/705 |
| 5,361,350 | 11/1994 | Conner et al. | 707/103 |
| 5,544,302 | 8/1996 | Nguyen | 345/326 |
| 5,583,983 | 12/1996 | Schmitter | 395/705 |
| 5,740,440 | 4/1998 | West | 395/704 |
| 5,761,511 | 6/1998 | Gibbons et al. | 395/705 |

OTHER PUBLICATIONS

Fowler et al., "Principles for wruting reusable libraries", SSR–ACM pp. 150–159, Jan. 1995.

Romer et al., "The structure and performance of interpreters", ASPLOS VII–ACM, pp. 150–159, Oct. 1996.

Gomes et al., "SIMKIT: A high performance logical process simulation class libraries in C + +", Proc. of the winter simulation conf., pp. 706–713, 1995.

Sato et al., "A methodology for specifying data distribution using only standard object oriented features", ICS–ACM, pp. 116–123, May 1997.

Visual object oriented programming concepts and environments, by Margrat Burnet, A. Goldberg and Ted Lewis, Manning Publications, 1994.

Rational Rose 4.0, Rational Rose Corporation, 1996.

Tutorial: real time object oriented modeling (Room), Selic, B. Conference paper, IEEE Comput. Soc Press, 1996.

*Primary Examiner*—Tariq R. Hafiz
*Assistant Examiner*—Anil Khatri
*Attorney, Agent, or Firm*—Townsend and Townsend and Crew LLP

[57] ABSTRACT

An interpretive language is initialized to include code that provides a bridge to an object-oriented environment. The interpretive language includes a command library to which are added commands that use the bridge to produce object instances and to employ member functions of classes within the object-oriented environment.

4 Claims, 2 Drawing Sheets

Microfiche Appendix Included
(1 Microfiche, 43 Pages)

40 → TcL_CC  AddClass  Ptr$_1$

42 → AddClass  savings

44 → AddClass  foobar

*FIG. 3.*

METHOD AND SYSTEM FOR PROVIDING INTERPRETIVE ACCESS TO AN OBJECT SYSTEM

This application claims benefit of provisional application 06/013,635, filed Mar. 18, 1996.

This specification contains a microfiche appendix which consists of one (1) sheet containing 43 frames.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

The present invention relates to generally providing an interpretive computer language with access to objects written in a object-oriented language such as C++.

Interpretive language programs abound, examples of which are found in BASIC, dBASE, JAVA, and Tool Command Program languages. Among the advantages provided by interpretive languages is the ability to design, develop, and debug an application program in a short amount of time. This advantage flows from the fact that there is no need to compile source code, perform the necessary linking, and then execute the resultant object code for de-bugging. Without an interpretive language debug tool, errors that are found in the source code of an application program being subjected to debugging must then be corrected by modifying the source code. Once corrected, the source code must again be run through the procedures of compiling, linking, and debugging. This process is repeated until all errors are found and corrected. Interpretive languages, on the other hand do not require compiling and linking.

Interpretive languages employ a programming language translator to translate each program statement into machine language and then execute it. The translator then proceeds to the next statement, and the next, and so on, until the program is finished. It is this in seriatim statement by statement translation and execution that makes an interpreted language convenient to use and debug since each line of code can be tested interactively.

Some interpretive languages may also be compiled. This is advantageous because the program is first developed and debugged using the interpreter, and when fully debugged, it is then compiled for a final version.

Interpretive languages also find particular use in commanding or controlling remote devices where the interpreter may take up very little space at the remote location.

Even though interpretive languages provide a number of advantages, some of which are outlined above, they do have drawbacks. One drawback of most, if not all, interpretive languages is their inability to interact with a object-oriented language to provide the interpretive language features not normally included in the interpretive language. Accordingly, there is a need to provide an interpretive language with access to a object-oriented programming environment, and the capability to permit the interpretive language to interact and use aspects of the object-oriented programming environment such as objects created in the C++ language.

SUMMARY OF THE INVENTION

The present invention provides a technique for an interpretive computer language, such as the public domain Tool Command Language ("TCL"), to create and interact with a object oriented language. The invention is disclosed in terms of interaction with an object-oriented programming environment such as C++. One aspect of the invention is that the interpretive language is provided transparent access to the underlying object system. No special coding is required in connection with the design of the object designer to export the object's interface to the interpreter.

The invention is described in terms of the TCL interpretive language. However, as those skilled in this art will soon realize, the invention can be used with any interpretive language having the capability of adding new commands to its interpretive vocabulary. The TCL interpretive language, for example, employs a command interpreter library, containing each command that may need interpreting in the program script, together with the location at which the object code resides for implementing the command. Thus, the addition of a command to the TCL environment requires only that the desired command name (and a memory location whereat implementing code resides) be added to the command interpreter library, and the creation of the implementing code.

According to the present invention, therefore, a command (Tcl_Createcommand or Tcl_CC) is added to the TCL command interpreter library to provide the TCL command interpreter with the ability to create additional commands. Object code will accompany the TCL package for implementing the Tcl_CC command, and the necessary application program interface to link the command to its implementing code.

Broadly, the invention includes an object catalog that is formed to contain type information (i.e., class specifications) describing one or more objects together with object code that implements any member functions that may be declared in the class specification. The object catalog is used to add commands to the interpreter environment. These added commands then use the dynamic interface of the underlying object system to construct objects, invoke methods, and destroy objects. A separate database is used to record the object instances created by the TCL interpretive language. The object instances maintained in the database can be used as formal parameters to the invoked methods.

The invention may be summarized as follows: First, the Tcl_CC command is used to create an "AddClass" command that is installed in the TCL interpreter library. The AddClass command establishes a bridge between the interpretive environment of TCL and the object-oriented language environment of C++ as represented by the class declarations contained in the object catalog.

Next, the "bridge" is employed to create yet another interpretive command that is added to the TCL command interpreter library that establishes access to a specific class declaration in the object catalog. This access can then be used to create an object instance of a type corresponding to the accessed class declaration. At the same time, another TCL command is added to the TCL command library. The object instance may be called for execution by this latter command.

It should now be seen that there are a number of advantages flowing from the present invention. First, providing and interpretive language with access to a object-oriented environment, and data items (i.e., object instances) and functions within that environment, greatly enhances the viability and capabilities of the interpretive language. Limitations of the interpretive language can be minimized if not obviated by the capabilities and flexibility offered by the object-oriented environment.

These and other advantages and features of the present invention will become apparent to those skilled in this art upon a reading of the following details of the invention, which should be taken in conjunction with the accompanying figures.

BRIEF DESCRIPTION OF THE DRAWINGS

FIG. 3 is an illustration of lines of code of an interpretive language illustrating the new commands created through the process steps illustrated in FIG. 1 to provide the interpretive language with access to a object-oriented environment.

DETAILED DESCRIPTION OF THE INVENTION

The present invention is discussed in terms of TCL, a public domain interpretive language developed at the University of California, Berkeley. However, the invention can be used in the environment of any interpretive language having the ability to add user-created commands to its command library.

As indicated above, the TCL command library contains a programming interface, TCL_CreateCommand (hereinafter Tcl_CC), that can be used to add commands to its command repertoire. The structure (syntax) for the Tcl_CC interface is the C++:

Tcl_CC (interp, CmdName, ptr, keepsake, deleteproc)

where,

"interp" is a pointer to the TCL interpreter environment;

"CmdName" is the name that will be given the command being created;

"ptr" is a pointer to the object code in memory that will implement the new command when it is encountered by the TCL command interpreter;

"keepsake" is a parameter that is retained by the TCL command interpreter, and passed to the code at ptr when the CmdName is encountered in the TCL script; and "deleteproc" is a pointer to the object/code in memory that will be called when the command is removed from the interpreter.

Digressing for the moment, TCL, like most interpretive languages, includes a command library accessible by the command interpreter. The command library contains an identification of each command that can be invoked by the interpreter. Associated with each command is a pointer to implementing code that realizes the command when encountered by the command interpreter. Thus, for example, the Tcl_CC command will be found in the TCL command library together with an associated pointer to the implementing code that will carry out the desired function of the Tcl_CC command. The command interpreter itself does nothing more, when called upon to begin execution of a TCL program, than to take each program statement and access the TCL command library to find the command specified in the statement (e.g., Tcl_CC). If found, the TCL interpreter uses the pointer associated with the command to invoke the implementing code, thereby causing execution of the command.

The present invention employs this added ability of the TCL interpreter to create commands to allow the TCL command interpreter to install two new commands in the TCL command library, each with a pointer to the code in memory that will implement those commands. The first new command establishes the bridge to the C++ environment containing a number of predefined object class specifiers (described more fully below). The second new command establishes access to a specific one of the object class specifiers.

Figure 1:
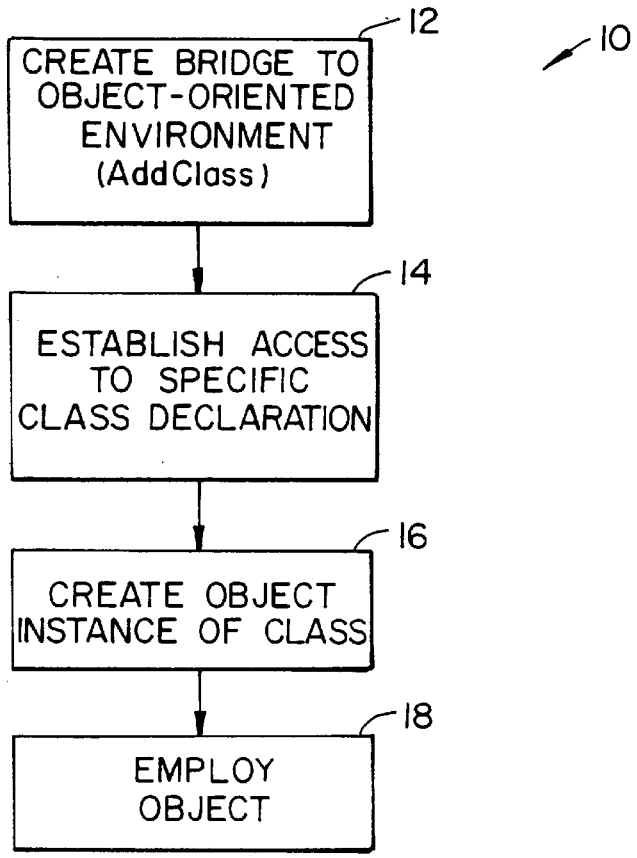
FIG. 1 is a flow diagram broadly illustrating creation of new commands that are added to the command library of the command interpreter.
Figure 2:
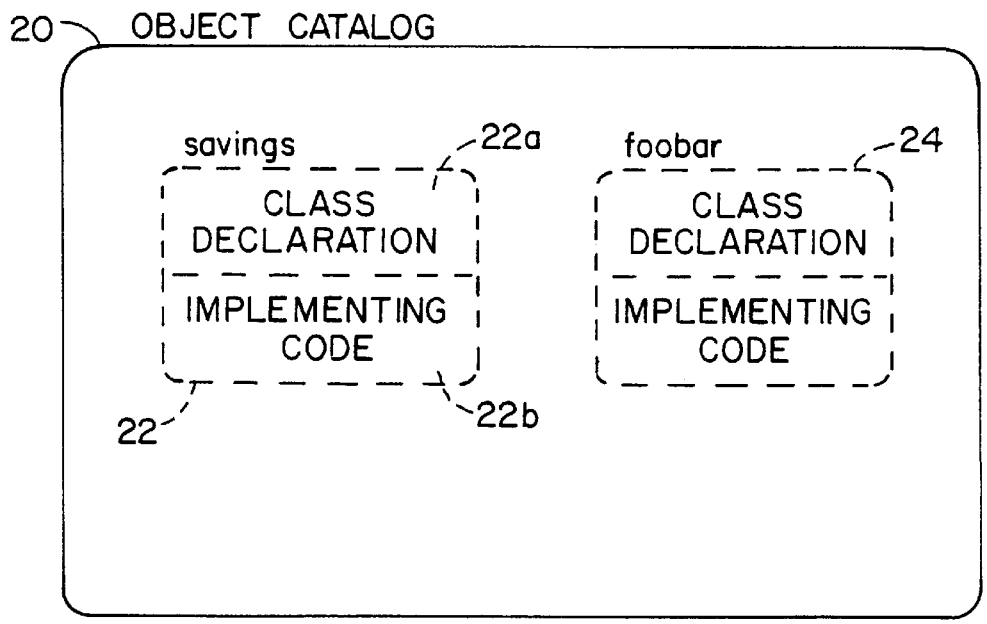
FIG. 2 is a diagrammatic illustration of the object catalog that contains the class specifications that form the object-oriented environment to which access is provided by the present invention.

Referring to FIG. 1, broadly illustrated by the flow diagram, designated generally with the reference numeral 10, are the steps taken to create these two new commands and their use in the C++ environment. First, at step 12, the TCL_CC command is used to create the first new command referred to as "AddClass," that is then installed in the TCL command library. The AddClass command, as will be apparent below, establishes the bridge from the interpreter environment to the object-oriented environment represented by an object catalog (FIG. 2). The object catalog contains one or more class specifiers, each including the class name, attributes, member functions, and an identification of any base class(es). The object catalog will also contain, for each class declaration, the object code needed to implement any member functions declared in the class.

Next, step 14 uses the bridge created by step 12 to develop the second TCL command that provides access to a specific class specification in the object catalog. This command is also installed in the TCL command library.

Step 16 uses the class specifier access command created in step 14 to, in turn, create an object instance of the class specified by the command, employing the class specifier and member function code in the object catalog. The newly created object instance is made accessible to the TCL interpreter environment by a command name, supplied by the creation step 14 that provided access to the object.

Finally, as step 18 indicates, the object can be used to call member functions of the object's class to act on the object as desired.

The content of the object catalog is broadly illustrated in FIG. 2. Designated with the reference numeral 20, the object catalog will normally reside in the memory of the computing system running the TCL interpreter at the time the interpreter is invoked. The object catalog 20 establishes the object-oriented environment to which access is provided an interpretive language by the present invention. The object catalog is, in essence, a collection of information that describes and implements the functionality of one or more object classes. The object catalog 20 contains, for each object class specification, two files: one is the class declaration containing information (name, attributes, member functions, etc.) commonly found in a class specifier; the other contains the implementing code for any member function declared in the class.

The object catalog 20 can contain any number of class specifications (class declaration and implementing code), but for purposes of the present discussion only two are shown in FIG. 2: a class specification 22, called "savings," and a class specification 24, called "foobar." As FIG. 2 illustrates, each class specification savings and foobar 22, 24 includes the class declaration file 22a, 24a and the respective implementing code file 22b, 24b for the member functions declared in the corresponding class.

As an example, assume that the class specifier 22 for saving is a simple class that is employed to develop object instances that implement and maintain a simple savings account. The class declaration 22a for savings then might take the following form:

```
class savings
{
    savings ()
    float balance
    float deposit(float amount)
    float getbalance ()
}
```

As can be seen, the class "savings" includes one constructor, "savings( )," a floating point attribute, "balance," and two member functions: "deposit" (which passes a floating point parameter, amount) and getbalance( ). The object code for implementing each member function, and the constructor, will be found in the implementing code portion or file 22b of the savings class. The class specifier for savings would be but one of a number of class specifications contained in the object catalog 20. The class declarations are preferably in an electronic form although the form could also be ASCII. An electronic form is used in order to preclude having to parse and interpret an ASCII declaration while the application is executing. Thus, the content of the object catalog 20 containing the object classes savings and foobar 22, 24 may look like:

```
class savings
    (class declaration in electronic form)
    (object code of member functions and
    stubroutines to the member functions)
class foobar
    (class declaration in electronic form)
    (object code of member functions and any
    stubroutines to the member functions)
etc.
```

Stubroutines are described in greater detail in the Provisional patent application, Ser. No. 60/009,213, filed Dec. 26, 1995 for "Method and System for Connecting Static and Dynamic Method Invocation Through Single Side Automatically-Generated Stub Functions in a Distributed Object System," and assigned to the Assignee of the Provisional patent application. Briefly, a stubroutine, as used here, is a code sequence that operates to translate a data structure containing parameters from one format to their native format (that expected by the member function). It will also operate to call a member function, and to build a data structure which contains the values of any parameters that were changed and an optional return result (if the return type is not "void"—i.e., non-existent). It is not necessary that stubroutines, as described in the referenced application be used, as long as there is some mechanism that can pass parameters in some predefined but common format to an implementation of a routine which expects a "custom" format of parameters.

Returning to FIG. 1, step 12, the creation of the bridge to the object-oriented environment is accomplished during initialization of the bridge environment using the Tcl_CC interface with the following syntax:

Tcl_CC (interp, "AddClass," ptr$_1$, φ, φ)

This will cause the command AddClass, and associated pointer (ptr$_1$,) to the implementing object code, to be added to the TCL command library (maintained in memory of the computing system running the command interpreter; or, if not in memory, in some storage accessible to the command interpreter). Thereafter, whenever AddClass is encountered in a TCL program script, it will be interpreted as a command, and the TCL command interpreter will initiate a call to the code located at ptr$_1$ to implement the addclass command. (Note that neither the keepsake or deleteproc parameters are used here.)

The new AddClass command will have the following interpretive language syntax (now recognizable by the TCL command interpreter because it has been added to the command library by the Tcl_CC command, above):

AddClass ClassName where,

"ClassName" is a name of a class specifier in the object catalog to which access will be provided by the AddClass command for creating objects of that class, or invoking member functions of the class—as described below.

The implementing code for the AddClass command (located ptr$_1$) will perform the following steps:

1. First, it will query the object catalog 20 with the first parameter (ClassName) following the AddClass command to locate a class specifier having a name that corresponds to that of the parameter.

2. If such a class specifier is found, a parameter identifying the location of the class specifier in the object catalog is returned. The AddClass code will then form a Tcl_CC command that operates to create yet another command that is added to the TCL command interpreter library. This new command is identified by the name of the parameter supplied by the AddClass command, and is associated with a pointer, ptr$_2$, to an implementing function when added to the command interpreter library. Thus, execution of an AddClass command will create yet another command, the implementing code of which is located at ptr$_2$.

If, when AddClass is executed, the name of the following parameter was not found in the Object Catalog, the code would return to the TCL interpreter with an error indication.

FIG. 3 illustrates use of the Tcl_CC command to create (first) the new AddClass, and the use of AddClass to add or implement two more functions. Assume a TCL script includes the statements 42, 44 shown in FIG. 3. As discussed above, the AddClass command forms the bridge to the C++ environment i.e.; of the object catalog 20. The AddClass command (created during initialization) is used in statement 42. When statement 42 is encountered, TCL command interpreter will call the code located in memory at a location designated by the pointer associated with the AddClass command; ptr$_1$. That code, in turn, will search the object catalog 20 for an object class identified as "savings."

If an object class identified as savings is found, the AddClass command implementing code will cause another new command, identified as "Savings," to be added to the interpreter command library. Associated with the new command, Savings, is the pointer, ptr$_2$, to the code in memory that will implement the savings command and a keepsake, containing a pointer (keepsake,) to the object catalog entry for the "savings" class specifier 22. As will be described in greater detail below, the code implementing the command, Savings, will operate to create an object instance of a type specified by the object class declaration 22a in the object catalog 20 at a location specified by the pointer keepsake$_1$.

In similar fashion, the statement 44 uses the AddClass command to create a TCL command "Foobar" that, when later executed, will create an object instance of a type specified by foobar object class declaration 24a (FIG. 2). Both of these newly-created commands, Savings and Foobar, are implemented by the same object code: that code located by the pointer $ptr_2$. Both the Savings and Foobar commands provide the TCL interpreter, as will be seen, with access to the specific one of the specifiers in the object catalog 20. Further, that access is employed to create object instances of the type delineated by the class declaration portion (22a, 24a) of the corresponding class specification (22, 24).

As an example of this latter ability, assume that after the Saving command is created (as described), the TCL command interpreter encounters, in a TCL program script, the statement Savings a.b This statement will cause the TCL command interpreter to create an object of the class Savings that it (the command interpreter) can later use to employ (call) member functions of that class. To do this the TCL command interpreter will access the TCL command interpreter library for the pointer, $ptr_2$, that was associated with the Savings command when created, and the $keepsake_1$ pointer (also associated with the Savings command when created), providing the location of the class specification associated with the Savings command: here, class specifier 22 ("Savings"). The TCL interpreter will then make a call for the code located at $ptr_2$, passing to it the pointer keepsake, and the "a.b" parameter in the Savings statement.

The Code at $ptr_2$ Will Then Perform the Following Steps

1. First, the object catalog will be accessed, using the pointer $keepsake_1$ that was passed to the implementing code at $ptr_2$, and used to locate the object class specifier 22a of the correct type: savings. Then, the class declaration 22a is searched for a constructor (if any) whose name is the same as the class, savings. In the savings class declaration, set forth above, there is only one constructor: savings( ). (There could be more than one constructor in the class declaration for savings. If so, the appropriate constructor may be located by the type of parameters it takes, e.g., floating point (float) integer (int), etc., or by the number of parameters passed to the function at $ptr_2$, according to conventional C++ technique. In this example, the constructor had no parameters, so the designer of the object catalog, and class specifier, must make sure that there is only one constructor with the signature "savings." However, if there are more than one savings constructors, the desired one must be located through the parameters it uses, in which case the parameters will follow "a.b", in the TCL Savings command—above.)

2. Once the appropriate constructor is found, an instance object (of a type delineated by the class declaration 22a) is constructed, using the code contained in the implementing code section 22b that implements the constructor. Therefore, a call is made for the code implementing the constructor (savings( )) that builds the "savings" object identified as "a.b." The implementing code for the object a.b is then kept in memory and the name of the object, a.b., stored in a database, together with an address whereat the object resides in memory.

3. Next, the implementing code at $ptr_2$ will initiate a Tcl_CC instruction to create a command A.b, and provide that command with a pointer, $ptr_3$, to the implementing code that will be employed when the A.b command is invoked by the TCL interpreter.

4. The implementing code writes the command A.b to the TCL command library, associating with it pointer, $ptr_3$, pointing to a location in memory at which the implementing code for A.b resides. The pointer, $keepsake_1$, (the location in the class specifier 22 (savings)) is also associated with the A.b command for use by the implementing code at $ptr_3$ when the A.b command is called by the TCL interpreter.

5. Finally, a return is made to the TCL interpreter.

Thus, invoking the Savings command adds yet another TCL command (here, A.b) to the TCL interpreter library; a command that is, in essence, an object of the class specification 22 of type "savings." The command A.b (or object) can be used to call member functions of the class savings (e.g., deposit or getbalance) to act on the object A.b. For example, consider the TCL statement:

A.b deposit 25.00.

When the TCL interpreter encounters the above-stated A.b command statement, it will use the pointer ($ptr_3$) associated with the A.b command to invoke the code located at $ptr_3$, passing to that code any parameters that accompany the A.b command: deposit and 25.00, as well the pointer ($keepsake_1$). The implementing code at $ptr_3$ uses $keepsake_1$ to locate the savings class specifier 22 (in the Object Catalog 20). Once located, the implementing code locates the member function identified by the "deposit" parameter/ specifically, the deposit member function in the implementing code section 22b). The A.b implementing code at $ptr_3$ then performs the following steps:

1. Locating the appropriate object class, and using the parameter accompanying the A.b. command, "deposit," the member function with the signature corresponding to deposit is found. As with constructors, location of the proper member function could also be based upon the number or type (floating point, integer, etc.) of parameters used—whichever distinguishes between the different member functions "deposit" if more than one.

2. The code at $ptr_3$ then causes the implementation code for the member function "deposit" to be called through a stubroutine, or other mechanism as discussed above. Parameters necessary for the member function execution (e.g., the parameter 25.00) are passed through the stubroutine and received by the member function code in an expected form.

Thus, the result of execution of the command

A.b deposit 25.00 is to cause a savings account (not shown) to be incremented by the value 25.00.

The invention also supports a pass by pointer operation in order to provide a return of an object rather than providing a copy of that object so that the object itself can be operated on by the calling function. As in the conventional C++ language, an asterisk (*) is used to identify variables that will be passed by pointer. (The discussion applies equally to passing the argument by reference, in which case the standard C++ ampersand (&) is used.)

As an example of this latter aspect, consider the simple "savings" class declaration set forth above, and assume that in addition to the member functions (savings( ), deposit, and getbalance) there is added a member function "withdraw (float*)". This declares the member function withdraw as one that expects to be supplied with a pointer that will identify the location of some floating point variable. Now, again using the added TCL interpreter command, A.b, to call the member function (withdraw) of savings, assume the TCL script includes the following lines of code, 51 and 58, with the statements:

```
51.  A.b getbalance -o x.y
      -        -        -
      -        -        -
58.  A.b withdraw x.y
```

When the first statement (51) is encountered, the TCL interpreter will use the pointer ($ptr_3$) associated with the A.b command, and call the corresponding implementing code, passing the parameters "-o" and "x.y". The flag "-o" tells the implementing code to store the value returned by the call to getbalance in memory or other storage as x.y, retaining a pointer to the location.

Subsequently, the TCL interpreter will encounter the statement (58) that calls the withdraw member function (A.b withdraw x.y). Again, the implementing code at $ptr_3$ is called, to invoke the withdraw member function (after first locating the class specifier 22 in the Object Catalog 20 with the pointer keepsake,). The A.b implementing code will examine the called member function and recognize that the withdraw member function does not expect a value, but the address or pointer to a value (as designated by the variable type identification "float*"). Accordingly, what is passed is x.y, the address of the floating point object that was returned by the earlier getbalance call. This allows the TCL interpreter to operate on the original value of the object rather than a copy.

It will be appreciated by those skilled in this art that the object catalog will be created and installed in memory to be made available to TCL interpreter when it is installed. (Alternatively, the TCL interpreter may call the object catalog from a persistent store, e.g., disk storage, to install it in memory.) The code segments that will reside at the various pointers ($ptr_1$, $ptr_2$, etc.) will similarly be installed in memory—either when the TCL interpreter is invoked, or installed by TCL script. (Which is preferred because pointers to where the code resides in memory can be retained by the TCL interpreter.)

In summary, what has been disclosed is a technique that allows an interpretive language to make use of pre-established object declarations. The Object Catalog must, of course, be prepared in advance, knowing what class declarations, attributes, and member functions are to be needed. The Object Catalog will also include the implementing code for each member function. Using the interpretive language's create command facility, new commands can be created and added to the interpretive language's command library. The code implementing the commands will be pre-formed and in usually in a complied form for quick and easy execution at a location identified by a pointer. Using this create command facility, and pre-formed code to implement commands, instances of class declarations can be constructed and used.

It should be appreciated, however, as those of ordinary skill in this art will readily recognize, that there is no magic as to the command name designations used for the commands created according to the present invention. For example, AddClass could just as well be designated "Couch," or "Trout," although AddClass does provide some indication of its function.

Microfiche Appendix provides the source code listing, in C++, for the code implementing the invention code that will be located at $ptr_2$ to implement the TCL command created by the AddClass command; and the source code listing, also in C++, for the implementing code located at $ptr_3$.

I claim:

1. A method of providing an interpretive language with access to an object-oriented programming language object system, the interpretive language having a command interpreter, a command library used by the command interpreter to interpret commands appearing in a program script, and a command facility to add new commands to the command library together with an association to program code to implement such new command, the method including the steps of:

providing an object library containing at least one specification of a class of the object-oriented language object system, the specification including at least one data item declaration and one member function declaration defining a member function for operating on the data item declaration;

using the command facility by the command interpreter to create an AddClass command that is added to the command library and associated with first implementing code;

the command interpreter employing the AddClass command with an enumerated specification of the specification contained in the object library to call the first implementing code, the first implementing code operating to use the command facility to create an object command that is added to the command library and associated with a location of specification contained in the object library and second implementing code; and the command interpreter calling the member function by using the object command with an identification of the member function such that the second implementing code locates the member function and the data item.

2. A method of providing a command interpreter of an interpretive language with access to an object-oriented programming language object system, the interpretive language having a command library used by the command interpreter for interpreting commands appearing in a program script, the method including the steps of:

providing an object library containing at least one specification of a class of the object-oriented language object system, the specification including at least one data item declaration and one member function declaration defining a member function for operating on the data item declaration;

providing an interpretive command facility that executes to add new commands to the command library together with an association, for each such new command, to program code to implement such new command, the command interpreter executing the command facility to create an AddClass command that is added to the command library and associated with first implementing code;

executing the AddClass command by the command interpreter with an enumerated specification of the specification contained in the object library to call the first implementing code, the first implementing code operating to use the command facility to create an object command that is added to the command library and associated with a location of specification contained in the object library and second implementing code; and the command interpreter calling the member function by using the object command with an identification of the member function such that the second implementing locates the member function and the data item.

3. A computer system comprising a processor having a memory wherein is located a computer program for causing the processor to provide a command interpreter of an interpretive language, including a command interpreter, with access to an object-oriented programming language object system, by associating with the command interpreter a command library for interpreting commands appearing in a program script;

providing an object library containing at least one specification of a class of the object-oriented language object system, the specification including at least one data item declaration and one member function declaration defining a member function for operating on the data item declaration;

providing the interpretive language with a command facility to add a new commands to the command library together with an association to program code to implement the new command, executing the command facility by the command interpreter to create an AddClass command that is added to the command library and associated with first implementing code;

executing the AddClass command by the command interpreter with an enumerated specification of the specification contained in the object library to call the first implementing code, the first implementing code operating to use the command facility to create an object command that is added to the command library and associated with a location of specification contained in the object library and second implementing code; and the command interpreter calling the member function by using the object command with an identification of the member function such that the second implementing locates the member function and the data item.

4. An article of manufacture comprising a medium for data storage wherein is located a computer program for providing an interpretive language with access to object-oriented programming language object system, by associating a command library with the interpretive language for interpreting commands appearing in a program script;

providing the interpretive language with a command facility to add a new command to the command library together with an association to program code to implement the new command;

providing an object library containing at least one specification of a class of the object-oriented language object system, the specification including at least one data item declaration and one member function declaration defining a member function for operating on the data item declaration;

the interpretive language then operating
(i) to use the command facility to create an AddClass command that is added to the command library and associated with first implementing code;
(ii) then employing the AddClass command with an enumerated specification of the specification contained in the object library to call the first implementing code, the first implementing code operating to use the command facility to create an object command that is added to the command library and associated with a location of specification contained in the object library and second implementing code; and
(iii) calling the member function by using the object command with an identification of the member function such that the second implementing locates the member function and the data item.

* * * * *